(12) United States Patent
Urushizaki et al.

(10) Patent No.: US 10,864,921 B2
(45) Date of Patent: Dec. 15, 2020

(54) ONBOARD APPARATUS

(71) Applicant: HONDA MOTOR CO., LTD., Tokyo (JP)

(72) Inventors: Naoyuki Urushizaki, Wako (JP); Kenta Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/675,580

(22) Filed: Nov. 6, 2019

(65) Prior Publication Data

US 2020/0164898 A1 May 28, 2020

(30) Foreign Application Priority Data

Nov. 26, 2018 (JP) ................................. 2018-220581

(51) Int. Cl.
*B60Q 1/00* (2006.01)
*B60W 50/14* (2020.01)
*B60R 1/00* (2006.01)
*B60K 35/00* (2006.01)

(52) U.S. Cl.
CPC ............ *B60W 50/14* (2013.01); *B60K 35/00* (2013.01); *B60R 1/00* (2013.01); *B60K 2370/152* (2019.05); *B60K 2370/167* (2019.05); *B60K 2370/171* (2019.05); *B60R 2300/70* (2013.01); *B60R 2300/802* (2013.01); *B60W 2050/146* (2013.01)

(58) Field of Classification Search
CPC . B60W 50/14; B60W 2050/146; B60K 35/00; B60K 2370/167; B60K 2370/152; B60K 2370/171; B60R 1/00; B60R 2300/70; B60R 2300/802
See application file for complete search history.

(56) References Cited

U.S. PATENT DOCUMENTS

| | | | | |
|---|---|---|---|---|
| 5,646,612 A * | 7/1997 | Byon | ..................... | G01S 13/931 340/903 |
| 7,468,933 B2 * | 12/2008 | Sugiura | ................. | B60R 21/013 340/436 |
| 7,586,400 B2 * | 9/2009 | Nagaoka | ............... | B60W 50/14 340/425.5 |
| 7,667,581 B2 * | 2/2010 | Fujimoto | ........... | G06K 9/00369 340/436 |
| 8,082,101 B2 * | 12/2011 | Stein | .................. | G06K 9/00805 701/301 |
| 8,199,046 B2 * | 6/2012 | Nanami | ................ | G01S 13/867 342/52 |
| 2002/0135469 A1 * | 9/2002 | Nakamura | .............. | F16H 61/16 340/436 |

(Continued)

FOREIGN PATENT DOCUMENTS

WO 2012/127677 A1 9/2012

*Primary Examiner* — Munear T Akki
(74) *Attorney, Agent, or Firm* — Thomas Horstemeyer, LLP

(57) ABSTRACT

An onboard apparatus includes an image capturing unit configured to capture a periphery of a vehicle, a display unit configured to display an image captured by the image capturing unit, and a notification unit configured to notify an occupant of information. The notification unit is configured to notify the occupant that the vehicle is in a startable state on the condition that, at least, display of the captured image has been started by the display unit.

6 Claims, 9 Drawing Sheets

(56) References Cited

U.S. PATENT DOCUMENTS

| | | | |
|---|---|---|---|
| 2010/0097202 A1* | 4/2010 | Watanabe | B60L 15/2045 340/439 |
| 2012/0113261 A1* | 5/2012 | Satoh | G06T 11/00 348/148 |
| 2012/0162427 A1* | 6/2012 | Lynam | H04N 5/23238 348/148 |
| 2014/0002256 A1 | 1/2014 | Hoshiba | |
| 2016/0188004 A1* | 6/2016 | Entenmann | G06F 3/0488 345/157 |
| 2017/0096102 A1* | 4/2017 | Nallapa | B60W 30/09 |
| 2017/0343799 A1* | 11/2017 | Ito | G02B 27/0101 |
| 2018/0093567 A1* | 4/2018 | Motomura | G02B 27/0149 |

* cited by examiner

ONBOARD APPARATUS

CROSS-REFERENCE TO RELATED APPLICATION(S)

This application claims priority to and the benefit of Japanese Patent Application No. 2018-220581 filed on Nov. 26, 2018, the entire disclosure of which is incorporated herein by reference.

BACKGROUND OF THE INVENTION

Field of the Invention

The present invention relates to an onboard apparatus.

Description of the Related Art

There has been proposed a technique of notifying an occupant that an engine is started, and a vehicle is in a startable state (International Publication No. WO 2012/127677). Such a notification allows the driver to easily recognize the state of the vehicle.

In a vehicle including a camera configured to capture the periphery of the vehicle, driving of the driver can be supported by the captured image. However, when the driver performs an engine starting operation, the start of display of the captured image may be delayed as compared to the start of the engine because of the time needed for activation processing of an electronic device such as a camera. If the occupant is notified before the start of display of the captured image that the vehicle is in a startable state, support of the driver at the time of vehicle start is difficult.

SUMMARY OF THE INVENTION

It is an object of the present invention to more reliably support a driver at the time of vehicle start.

According to the present invention, there is provided an onboard apparatus comprising: an image capturing unit configured to capture a periphery of a vehicle; a display unit configured to display an image captured by the image capturing unit; and a notification unit configured to notify an occupant of information, wherein the notification unit is configured to notify the occupant that the vehicle is in a startable state on the condition that, at least, display of the captured image unit has been started by the display unit.

Further features of the present invention will become apparent from the following description of exemplary embodiments (with reference to the attached drawings).

DESCRIPTION OF THE EMBODIMENTS

<Arrangement of Vehicle>

Figure 1A:
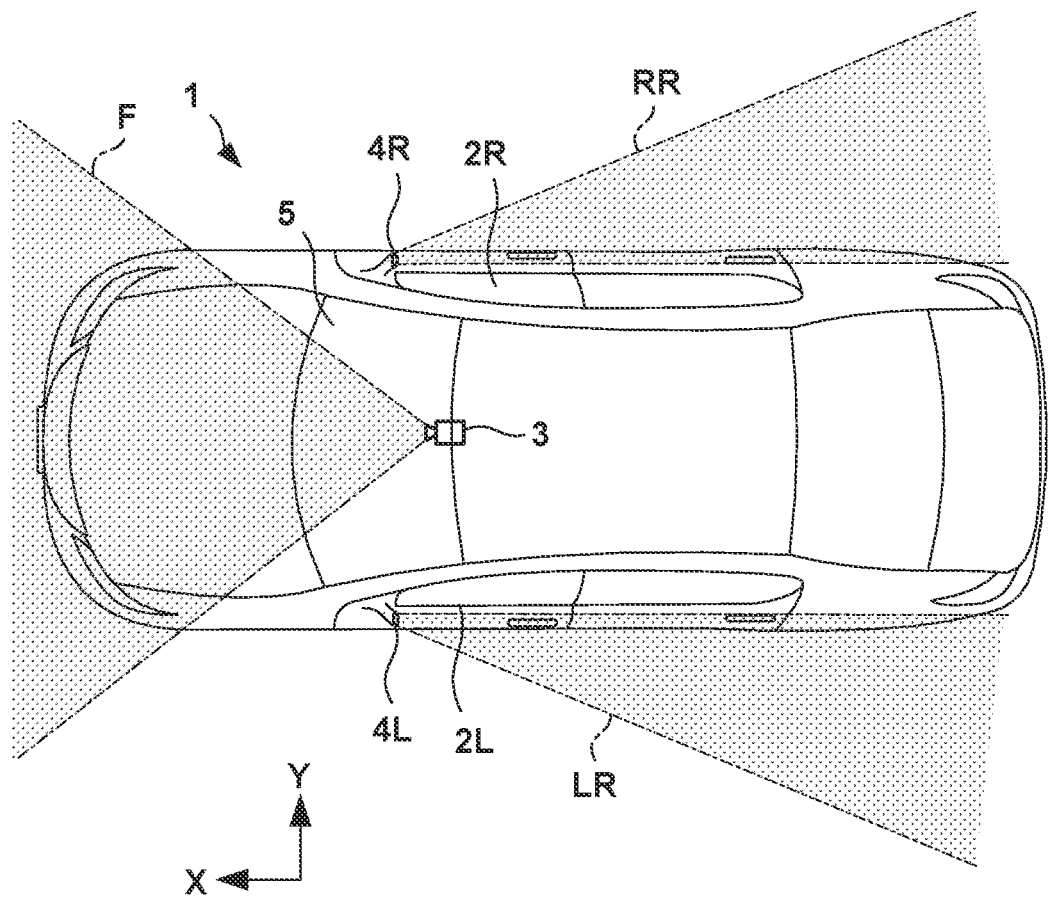
FIGS. 1A and 1B are a plan view and a side view of a vehicle including an onboard apparatus according to an embodiment of the present invention.
Figure 1B:
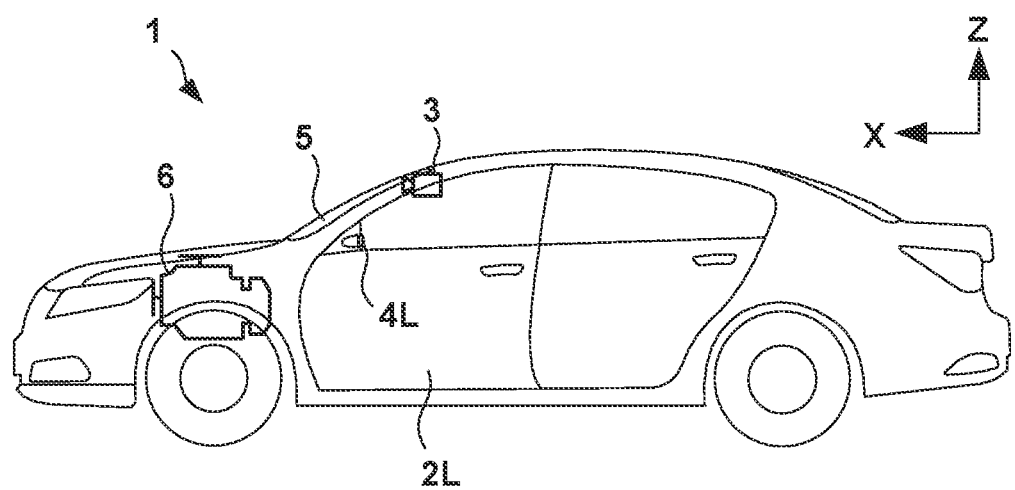

FIGS. 1A and 1B are a plan view and a side view of a vehicle 1 as an application example of the present invention. Note that in the drawings, an arrow X indicates the longitudinal direction of the vehicle 1, and an arrow Y indicates the vehicle width direction of the vehicle 1. An arrow Z indicates the vertical direction.

The vehicle 1 is, for example, a sedan-type four-wheeled vehicle. The vehicle 1 includes two seats in the front row adjacent to a windshield 5, and two seats in the rear row. The right seat in the front row is the driver's seat, and the left seat is the passenger seat. The vehicle 1 includes a total of four doors adjacent to the seats. A door 2R is the door adjacent to the driver's seat, and is the right door on the front side. A door 2L is the door adjacent to the passenger seat, and is the left door on the front side. A driving unit 6 is provided in the front part of the vehicle 1. The driving unit 6 includes a driving source that generates the driving force of the vehicle 1. In this embodiment, the driving source is an engine (internal combustion engine). The driving unit 6 includes an automatic transmission in addition to the engine.

The vehicle 1 includes image capturing devices 3, 4R, and 4L configured to capture the periphery of the vehicle 1. Each of the image capturing devices 3, 4R, and 4L is, for example, a camera including an image capturing element such as an image sensor and an optical system such as a lens. The image capturing device 3 captures an image in an image capturing range F in front of the vehicle 1. An image captured by the image capturing device 3 is used to, for example, detect an obstacle in front of the vehicle 1 or recognize a road dividing line (for example, a white line).

The image capturing device 4R is arranged in front of the door 2R, and has an image capturing range RR in the rear on the right side of the vehicle 1. The image capturing device 4L is arranged in front of the door 2L, and has an image capturing range LR in the rear on the left side of the vehicle 1. The image capturing devices 4R and 4L are generically called image capturing devices 4.

Figure 2:
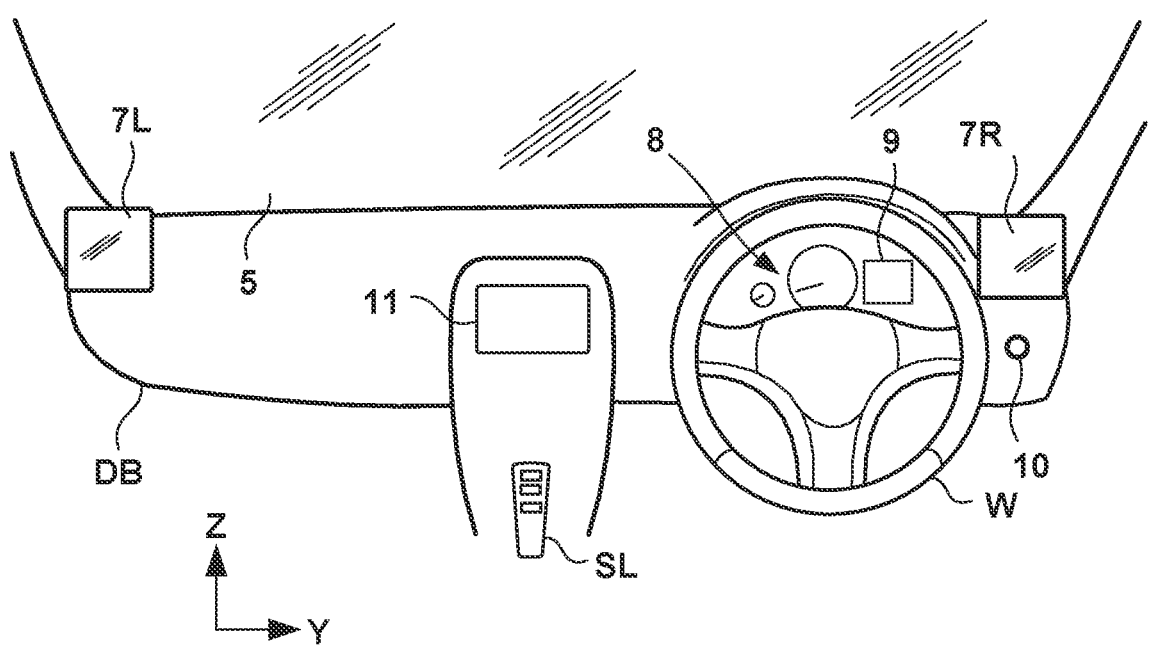
FIG. 2 is a view showing the interior of the vehicle shown in FIGS. 1A and 1B.

FIG. 2 is a view schematically showing the inside of the vehicle 1, and is a view particularly showing the periphery of a dashboard DB. A steering wheel W is provided in front of the driver's seat. On the front side of it, an instrument panel 8 is provided on the dashboard DB. An ignition switch 10 is provided at the right end of the dashboard DB. The driver can instruct the engine start of the driving unit 6 by operating the ignition switch 10. A display device 11 configured to display map information or the like is provided at the center of the dashboard DB in the vehicle width direction, and a shift lever SL that accepts a shift operation for the automatic transmission is arranged near the display device 11.

The instrument panel 8 includes a notification device 9. The notification device 9 is a device that notifies the occupant of various kinds of information, and is an image display device in this embodiment. The notification device 9 may be a voice output device, or may be the combination of an image display device and a voice output device. In this embodiment, if the vehicle 1 is in a startable state, the notification device 9 notifies the occupant of it.

A display device 7R is arranged at the right end of the dashboard DB, and a display device 7L is arranged at the left end. Each of the display devices 7R and 7L is an image display device, and is, for example, a liquid crystal display device. An image captured by the image capturing device 4R is displayed on the display device 7R, and an image captured by the image capturing device 4L is displayed on the display device 7L. The display devices 7R and 7L are generically called display devices 7.

The vehicle 1 according to this embodiment is a side-mirrorless vehicle. The image capturing devices 4 and the display devices 7 are camera monitoring systems (CMS) provided to cause the occupant (in particular, the driver) to confirm the sides and the rear of the vehicle 1 in place of side mirrors (door mirrors). Hence, at least during traveling of the vehicle 1, the display devices 7 always display images captured by the image capturing devices 4.

Figure 3:
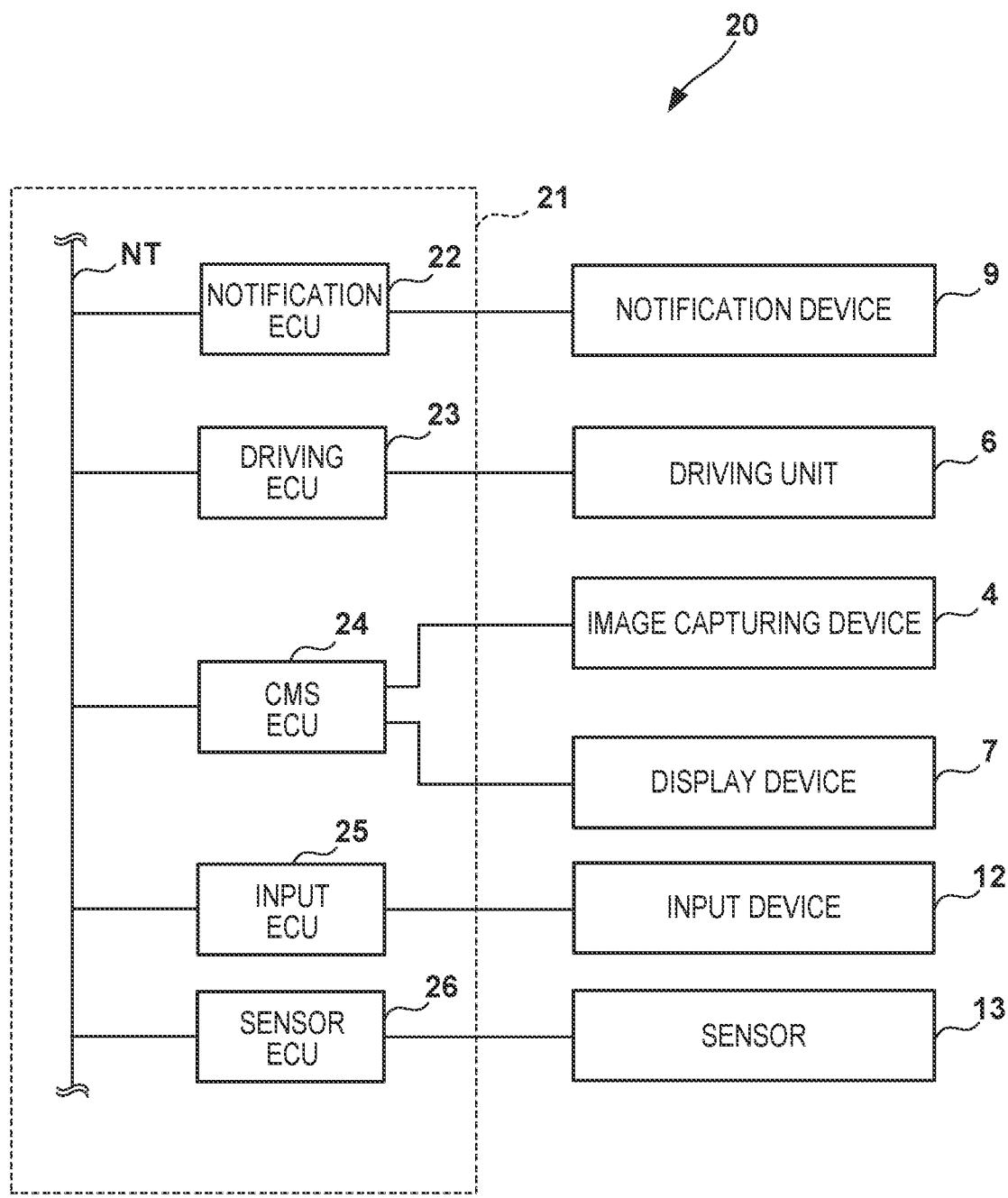
FIG. 3 is a block diagram of the onboard apparatus according to an embodiment of the present invention.

FIG. 3 is a block diagram showing an example of the arrangement of an onboard apparatus 20 of the vehicle 1. The onboard apparatus 20 is a unit configured to control each device in the vehicle 1. FIG. 3 shows only components needed in association with the feature of this embodiment to be described later.

The onboard apparatus 20 includes a control unit 21. The control unit 21 includes a plurality of ECUs (Electric Control Units) 22 to 26. The ECUs are connected to be communicable with each other via an in-vehicle network NT. Each ECU includes a processor represented by a CPU, a storage device such as a semiconductor memory, an interface to an external device, and the like. The storage device stores a program to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment.

The ECU 22 controls the notification device 9. The ECU 23 controls the driving unit 6. The ECU 24 controls the image capturing devices 4 and the display devices 7, thereby forming a camera monitoring system. The ECU 25 accepts an occupant operation for an input device 12. The input device 12 includes, for example, the above-described ignition switch 10 and a remote controller or a door switch used for an unlock/lock operation of the doors. The ECU 26 controls a sensor 13 and acquires a detection result. In relation to a description to be made later, the sensor 13 includes a temperature sensor configured to detect a temperature. Note that in FIG. 3, the names of the representative functions of the ECUs 22 to 26 are given. For example, the ECU 22 is denoted by "notification ECU".

<Example of Processing of Control Unit>

Figure 4:
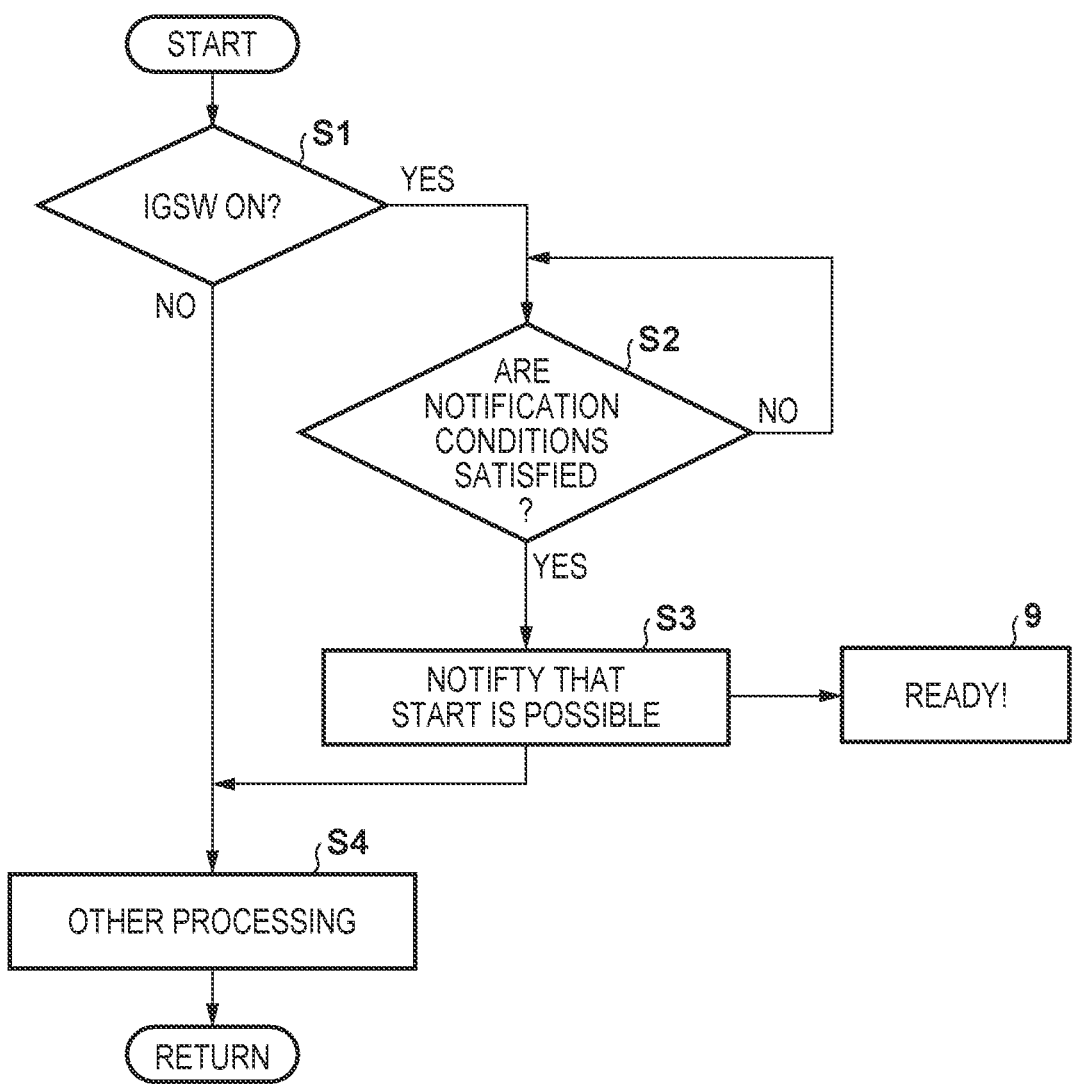
FIG. 4 is a flowchart showing an example of processing executed by the onboard apparatus shown in FIG. 3.

An example of processing of the control unit 21 will be described. FIG. 4 is a flowchart showing an example of notification processing executed by the ECU 22. In this embodiment, if the vehicle 1 is ready for start, the occupant is notified by the notification device 9 that the vehicle 1 is in a startable state. By such a notification, the driver can readily recognize the state of the vehicle 1 and smoothly perform the starting operation. In this embodiment, this notification is executed based on an engine starting operation, that is, the operation of the ignition switch 10.

Referring to FIG. 4, in step S1, it is determined whether an operation (switch ON) on the ignition switch 10 is performed. The operation on the ignition switch 10 is, for example, recognized by the ECU 25 and notified to each ECU. If an operation on the ignition switch 10 is performed, the process advances to step S2. If an operation is not performed, the process advances to step S4.

In step S2, it is determined whether notification conditions are satisfied. If the notification conditions are satisfied, the process advances to step S3. If the notification conditions are not satisfied, the process waits for satisfaction. If the notification conditions are not satisfied for a predetermined time, it may be determined that an abnormality has occurred, and a notification concerning the occurrence of the abnormality may be made.

In step S3, the notification device 9 notifies the occupant that the vehicle 1 is in a startable state. In FIG. 4, as an example of the notification, characters "READY!" are displayed on the notification device 9. By this display, the occupant can recognize that the vehicle 1 can start. This display ends when, for example, the vehicle 1 starts. In step S4, other processes are performed, and processing of one cycle ends.

The notification conditions in step S2 will be described next. One of the notification conditions is that the engine that forms the driving unit 6 is in an operable state and, more particularly, start completion. In the vehicle 1 according to this embodiment, the start of the vehicle 1 is premised on the start of the engine. When the start of the engine is completed, the ECU 23 notifies the ECU 22 of it (transmits a completion notification).

Another notification condition is that display of images captured has been started on the display devices 7 by the image capturing devices 4. The vehicle 1 according to this embodiment is a side-mirrorless vehicle, and the driver who is facing the front of the vehicle 1 can confirm the sides and the rear of the vehicle 1 on the display devices 7. Even if the display on the display devices 7 is not started, the start of the vehicle 1 itself is possible. However, in a state in which the captured images of the sides and the rear of the vehicle 1 are not displayed on the display devices 7, driving support for the driver is not sufficient. Hence, in this embodiment, the start of display on the display devices 7 is set as one of the notification conditions.

Note that other conditions can also be included in the notification conditions. The other notification conditions are, for example, wearing of the seatbelt by the driver, and operation preparation completion of another component (for example, the automatic transmission) of the driving unit 6.

Figure 5:
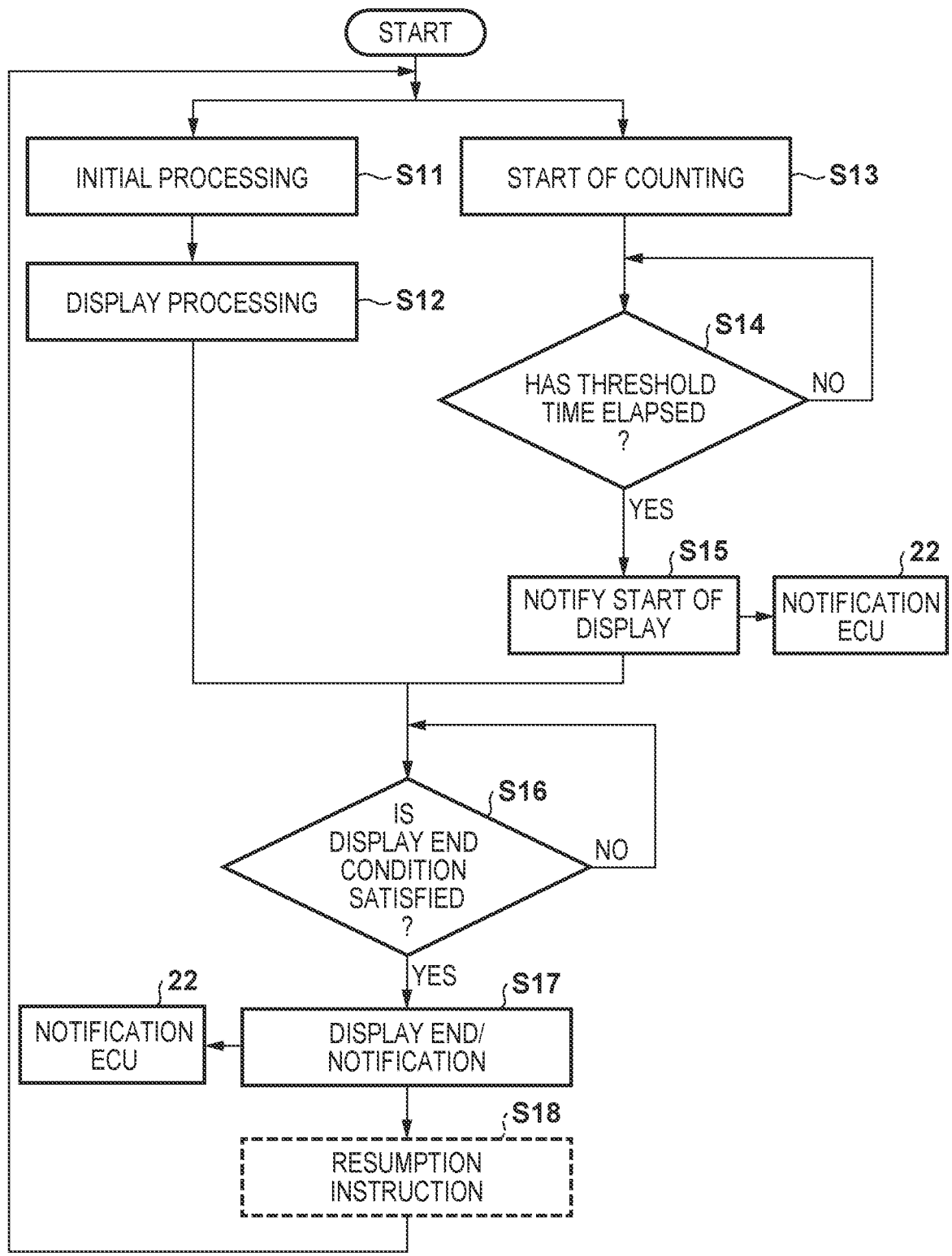
FIG. 5 is a flowchart showing an example of processing executed by the onboard apparatus shown in FIG. 3.

The ECU 24 notifies the ECU 22 of the start of display of images captured by the image capturing devices 4 on the display devices 7 (transmits a display start notification). FIG. 5 is a flowchart showing an example of processing of the ECU 24 in association with this notification. The processing shown in FIG. 5 is started based on the start of use of the vehicle 1 and repetitively executed until the end of use of the vehicle 1. In this embodiment, the start of use is door unlock from the outside of the vehicle by the occupant, and the end of use is door lock from the outside of the vehicle by the occupant. The lock operation and the unlock operation of the door by the occupant are recognized by the ECU 25 and notified to each ECU.

In step S11, initial processing is executed. The initial processing is activation processing of the CMS system, and predetermined processes such as various kinds of initial settings concerning the image capturing devices 4 and the display devices 7 are executed. When the processing of step S11 is completed, the process advances to step S12, and images captured by the image capturing devices 4 are displayed on the display devices 7. After that, the process advances to step S16.

The processes of steps S13 to S15 are executed in parallel to the processes of steps S11 and S12. The processes of steps S13 to S15 are processes for notifying the ECU 22 of the start of display. A predetermined time is necessary after the ECU 24 performs the process of step S11 until display on the display devices 7 is started. A sensor configured to detect the start of display on the display devices 7 may be provided to specify the start of display on the display devices 7. However, when the sensor is provided, the cost increases. In this embodiment, the elapse of a time (to be referred to as a threshold time hereinafter) needed for the display devices 7 to change from a non-display state to a display state is counted, and it is determined that the display devices 7 have started display based on the elapse of the threshold time.

Figure 8A:
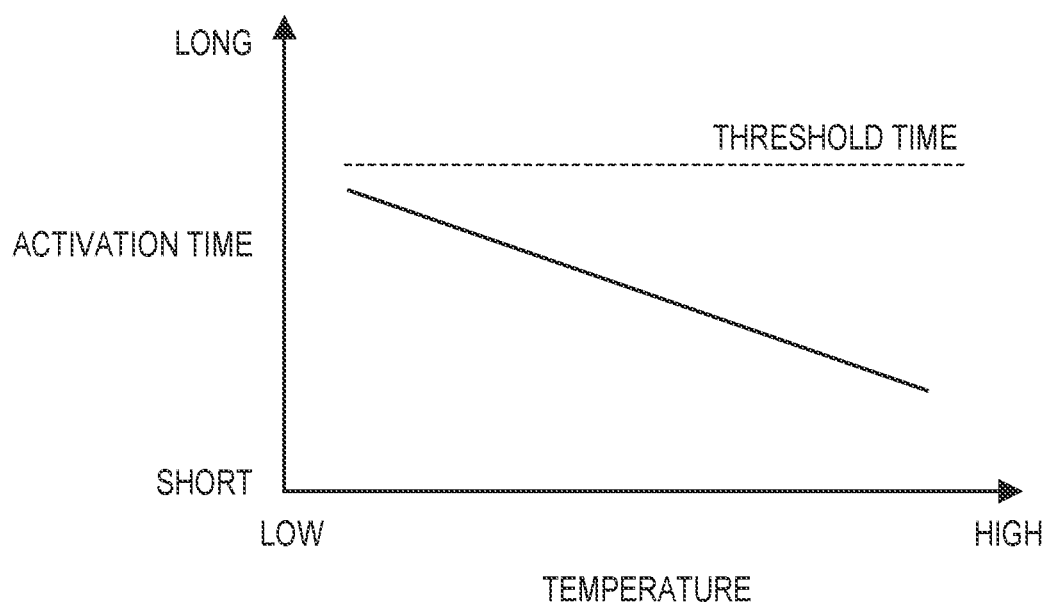
FIGS. 8A and 8B are views showing examples of setting of a threshold time.
Figure 8B:
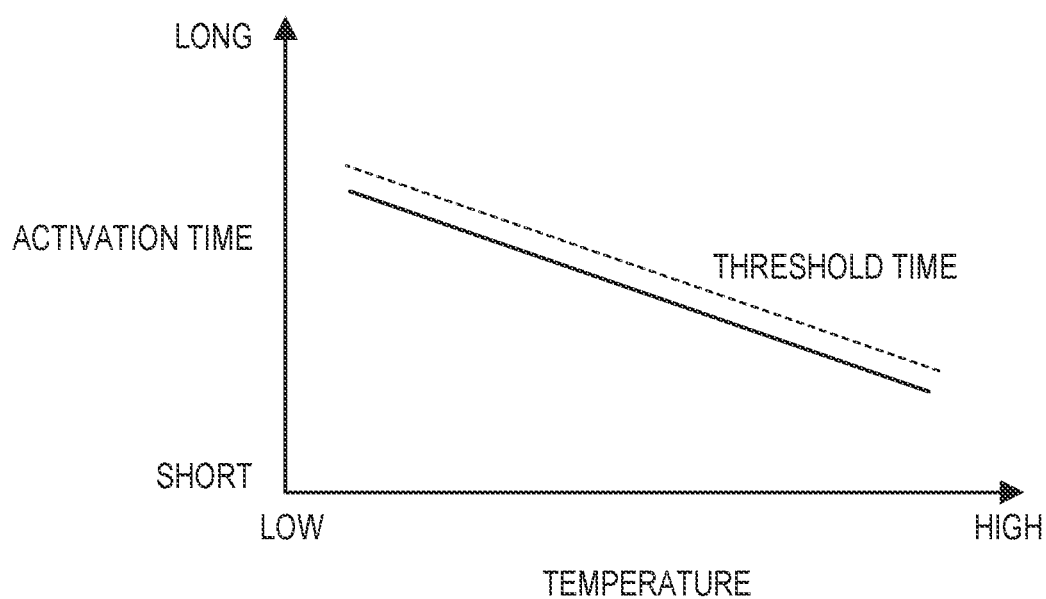

As the threshold time, a time in which display is reliably started is set based on the activation time (mainly a time needed for the initial processing (step S11)) of the ECU 24, the activation time of the image capturing devices 4, and the activation time of the display devices 7 (mainly a time needed for the operation of hardware until display stabilizes). The activation time of the ECU 24 is the execution time of the program and can therefore be specified relatively easily. The activation time of the display devices 7 sometimes depends on the temperature. For example, if a liquid crystal display device is employed, a time tends to be needed to stabilize display at a low temperature than at a high temperature. FIGS. 8A and 8B schematically show examples of the relationship between the temperature and the threshold time. A solid line represents an example of the activation time of the ECU 24 and that of the display devices 7 until the start of the display, and a broken line represents an example of the threshold time.

FIG. 8A shows an example of a fixed threshold time uniformly determined independently of the temperature. In this case, a time longer than the activation time at a low temperature, which is the longest activation time, is set to the threshold time, thereby notifying the ECU 22 of the start of display after the display devices 7 have reliably started display. The threshold time can be obtained by, for example, experiments.

FIG. 8B shows an example of the threshold time that is changed in accordance with the temperature. In this case, a time longer than the activation time that varies in accordance with the temperature is set to the threshold time, thereby notifying the ECU 22 of the start of display after the display devices 7 have reliably started display. The relationship between the temperature and the threshold time can be obtained by, for example, experiments and stored in a storage device provided in the ECU 24. Before the start of counting in step S13, the threshold time can be set by acquiring the information of the current temperature. The information of the current temperature can be obtained from the temperature sensor included in the sensor 13. As another acquisition method, for example, the information of the temperature can be obtained by communication from a server that provides weather information.

In an example in which the threshold time is a fixed time, like the example shown in FIG. 8A, threshold time setting processing is unnecessary, and the processing can be simplified. However, if the temperature is higher, the threshold time is unnecessarily long. In an example in which the threshold time is changed in accordance with the temperature, like the example shown in FIG. 8B, although the processing is more complex than in the example of FIG. 8A, a shorter threshold time can be set in accordance with the temperature.

Referring back to FIG. 5, in step S13, counting is started. In step S14, it is determined whether the time from the start of counting in step S13 exceeds the threshold time. If the time exceeds the threshold time, the process advances to step S15. If the time does not exceed the threshold time, the process waits for the elapse. In step S15, the ECU 22 is notified of the start of display. This notification is a determination factor of notification condition satisfaction of step S2 in FIG. 4 by the ECU 22. After that, the process advances to step S16.

With the above processing, images captured by the image capturing devices 4 are always displayed on the display devices 7. In some cases, the necessity of displaying the images of the sides and the rear on the display devices 7 is low although the vehicle 1 is used, like a case in which the vehicle 1 with the occupant on board stops the engine and stops for a long time. In this embodiment, the CMS system is stopped in such a case to suppress power consumption.

In step S16, it is determined whether a display end condition is satisfied. The display end condition is, for example, that a state in which the vehicle 1 with the occupant on board stops the engine and stops continues for a predetermined time (for example, 5 to 10 min) or more. If the display end condition is satisfied, the process advances to step S17. If the display end condition is not satisfied, the display state is maintained.

In step S17, the ECU 22 is notified that the display of images captured by the image capturing devices 4 on the display devices 7 is to be ended. In addition, the image capturing devices 4 and the display devices 7 are shut down. The ECU 24 changes to substantially the same state as that in starting the processing in FIG. 5. In this state, if a resumption instruction (step S18) is received, the processes of steps S11 and S13 that are the process at the start of processing are executed. In this embodiment, the resumption instruction indicates a case in which an operation (switch ON) on the ignition switch 10 is performed, and the ECU 25 makes a notification of it. As the situation, after the vehicle 1 with the occupant on board stops the engine and stops for a long time, the engine starting operation is performed.

Figure 6:
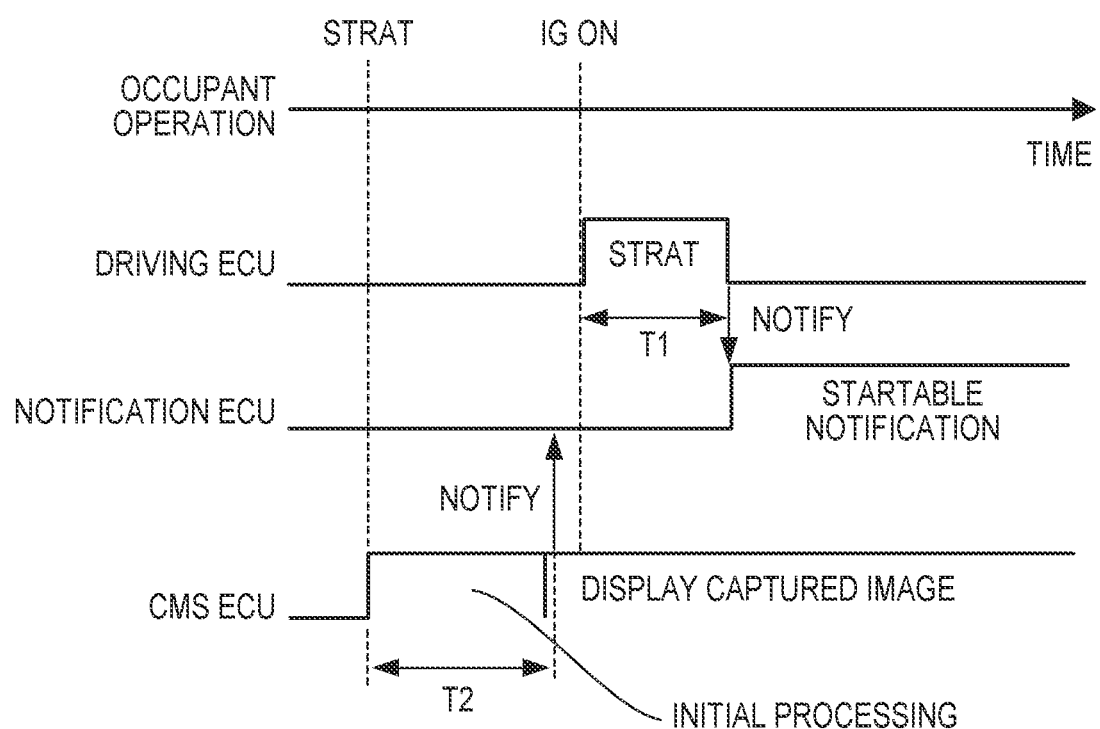
FIG. 6 is a timing chart showing an example of a notification to an occupant.
Figure 7:
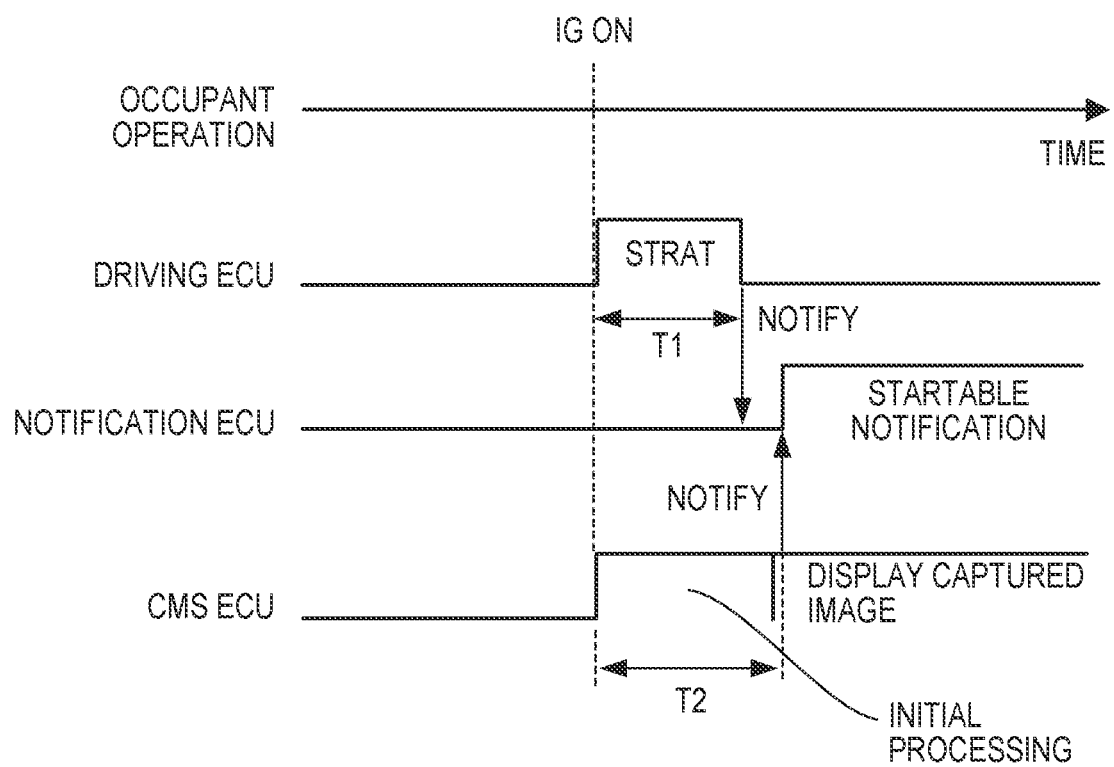
FIG. 7 is a timing chart showing an example of a notification to an occupant.

FIGS. 6 and 7 are timing charts showing examples of an notification condition satisfaction pattern until the notification device 9 displays "READY!" in step S3 in different situations of the vehicle 1.

FIG. 6 shows a case in which the notification device 9 displays "READY!" based on the start of use of the vehicle 1 (door unlock from the outside of the vehicle), and shows the satisfaction timings of notification conditions including the start of the engine and the start of display on the display devices 7. "Start" indicates the use start timing of the vehicle 1. At this stage, the ECU 23 does not start the engine. On the other hand, the ECU 24 starts the processing shown in FIG. 5, and after the elapse of a time T2 corresponding to the threshold time, notifies the ECU 22 of the start of display. The time T2 is, for example, several sec.

"IG ON" indicates a timing at which the operation (switch ON) on the ignition switch 10 is performed. At this stage, the ECU 23 starts the engine, and after the elapse of a time T1 corresponding to the actual time until start completion, notifies the ECU 22 of the start completion. The time T1 is, for example, several sec. In this example, two conditions, that is, the engine start completion and the start of display on the display devices 7 are the notification conditions. The notification conditions are satisfied by the engine start notification, and the ECU 22 causes the notification device 9 to display "READY!" in step S3.

FIG. 7 shows a case in which the vehicle 1 with the occupant on board stops the engine and stops for a long time, and after that, the notification device 9 displays "READY!" based on an engine start instruction. This case corresponds to the situation of step S18 in FIG. 5.

"IG ON" indicates a timing at which the operation (switch ON) on the ignition switch 10 is performed. At this stage, the ECU 23 starts the engine, and after the elapse of the time T1 corresponding to the actual time until start completion, notifies the ECU 22 of the start completion. Additionally, at this stage, the ECU 24 also starts processing, and after the elapse of the time T2 corresponding to the threshold time, notifies the ECU 22 of the start of display.

In the illustrated example, time T2>time T1. In this example as well, two conditions, that is, the engine start completion and the start of display on the display devices 7 are the notification conditions. The notification conditions are satisfied by the display start notification of the display devices 7, and the ECU 22 causes the notification device 9 to display "READY!" in step S3. As described above, although the start of the vehicle 1 itself is enabled by starting the engine, "READY!" is not displayed at this point of time. "READY!" is displayed after the start of display on the display devices 7.

<Case of Fault of CMS System>

Figure 9A:
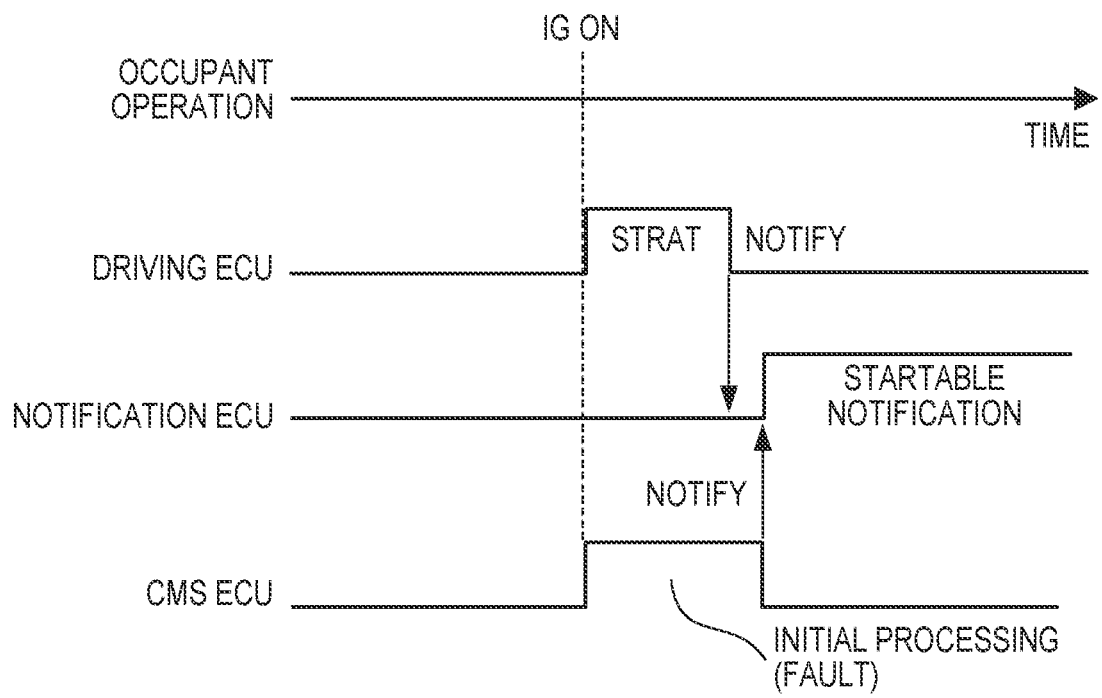
FIG. 9A is a timing chart showing an example of a notification to an occupant in a case of a fault of a display device.
Figure 9B:
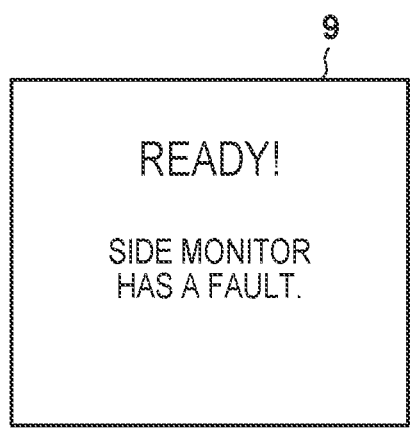
FIG. 9B is a view showing an example of a notification.

If the CMS system has a fault, display on the display devices 7 is not started. In this case, a form in which the notification device 9 does not notification that the vehicle 1 is in the startable state can be employed, but the convenience of the occupant may be lost. Hence, if display is difficult because of a fault, a form in which the start of display on the display devices 7 is not included in the notification condition can also be employed exceptionally. FIGS. 9A and 9B show examples. FIG. 9A is a timing chart showing an example of an notification condition satisfaction pattern until the notification device 9 displays "READY!" in step S3. Like FIG. 7, the example of FIG. 9A shows a case in which the vehicle 1 with the occupant on board stops the engine and stops for a long time, and after that, the notification device 9 displays "READY!" based on an engine start instruction. This also applies to a case in which "READY!" is displayed based on the start of use of the vehicle 1, like FIG. 6. FIG. 9B shows an example of a notification by the notification device 9.

"IG ON" indicates a timing at which the operation (switch ON) on the ignition switch 10 is performed. At this stage, the ECU 23 starts the engine, and after the elapse of the time T1 corresponding to the actual time until start completion, notifies the ECU 22 of the start completion. Additionally, at this stage, the ECU 24 also starts processing, and determines a fault in the constituent elements of the CMS system such as the image capturing devices 4 and the display devices 7 in the initial processing (step S11). The fault determination can be performed based on, for example, the presence/absence of a response to a response request signal. If it is determined a fault exists, the ECU 24 transmits a fault notification to the ECU 22.

In the example of FIG. 9A as well, two conditions, that is, the engine start completion and the start of display on the display devices 7 are the notification conditions. The notification conditions are satisfied by the engine start notification by the fault notification from the ECU 24, and the ECU 22 causes the notification device 9 to display "READY!" in step S3. Additionally, in this case, it is also notified that a fault has occurred in the CMS system. In the example shown in FIG. 9B, the notification device 9 displays "a side monitor has a fault" and notifies the occupant that the captured images of the sides and the rear are not displayed on the display devices 7 because of the fault. This can urge the occupant to repair the CMS system.

Other Embodiments

An image captured by the image capturing device 3 can also be displayed on, for example, the display device 11. In the above-described embodiment, however, the notification conditions to cause the notification device 9 to notify that the vehicle 1 is in the startable state do not include a condition concerning the activation of the image capturing device 3. This is because the image captured by the image capturing device 3 is not assumed to be an image to be always displayed in this embodiment, and because the image capturing range F of the image capturing device 3 can visually be recognized by the driver through the windshield 5. That is, the notification conditions need not include activation of all of the image capturing devices and the display devices for captured images, and may include only activation of predetermined image capturing devices and display devices such as a component that always displays a captured image during traveling, as in the above-described embodiment. Conversely, a form in which activation of all of the image capturing devices and the display devices for captured images is included can also be employed.

In the above-described embodiment, as the driving source provided in the driving unit 6, an internal combustion engine has been exemplified. However, another driving source such as an electric motor may be employed. Alternatively, the driving source may be formed by a combination of a plurality of devices like a combination of an internal combustion engine and an electric motor. If the driving source includes an electric motor, a notification condition representing that the electric motor is in an operable state can be, for example, a state in which the driving circuit of the electric motor is activated.

SUMMARY OF EMBODIMENT

The above-described embodiment discloses at least the following onboard apparatus.

1. According to the above embodiment, there is provided an onboard apparatus (for example, 20) comprising:

an image capturing unit (for example, 4) configured to capture a periphery of a vehicle (for example, 1);

a display unit (for example, 7) configured to display an image captured by the image capturing unit; and a notification unit (for example, 9) configured to notify an occupant of information, wherein the notification unit notifies the occupant that the vehicle is in a startable state on the condition that, at least, display of the captured image has been started by the display unit (for example, FIGS. 6 and 7).

According to this embodiment, it is possible to more reliably support the driver at the time of vehicle start.

2. In the above embodiment, the notification unit notifies the occupant that the vehicle is in the startable state on the condition that, at least: a driving source that generates a driving force of the vehicle is in an operable state; and display of the captured image has been started by the display unit (for example, FIGS. 6 and 7).

According to this embodiment, it is possible to more reliably notify that start preparation of the vehicle is completed and support the driver at the time of vehicle start.

3. In the above embodiment, the start of display of the captured image by the display unit is determined based on an elapse of a time (for example, a threshold time) needed for the display unit to change from a non-display state to a display state.

According to this embodiment, a sensor configured to detect the start of display need not be provided, and the start of display can be determined at a lower cost.

4. In the above embodiment, the time is a time uniformly determined independently of a temperature (for example, FIG. 8A).

According to this embodiment, it is possible to determine the start of display without needing setting processing of the time.

5. In the above embodiment, the time is a time that is changed in accordance with a temperature (for example, FIG. 8B).

According to this embodiment, it is possible to set a shorter time as the time in accordance with the temperature.

6. In the above embodiment, if display by the display unit is difficult because of a fault, the notification unit notifies the occupant that the vehicle is in the startable state even if display of the captured image has not been started by the display unit (for example, FIG. 9A).

According to this embodiment, it is possible to improve the convenience of the occupant.

7. In the above embodiment, the image capturing unit captures a side and a rear of the vehicle (for example, RR, LR), and the vehicle is a side-mirrorless vehicle.

According to this embodiment, it is possible to ensure the visibility of the sides and rear of the vehicle at the time of vehicle start.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An onboard apparatus comprising:
    an image capturing unit configured to capture a periphery of a vehicle;
    a display unit configured to display an image captured by the image capturing unit; and
    a notification unit configured to notify an occupant of information,
    wherein the notification unit is configured to notify the occupant that the vehicle is in a startable state on a condition that, at least, display of the captured image has been started by the display unit, and
    if the display unit does not display because of a fault, the notification unit notifies the occupant that the vehicle is in the startable state even if display of the captured image has not been started by the display unit.

2. The apparatus according to claim 1, wherein the notification unit notifies the occupant that the vehicle is in the startable state on the condition that, at least: a driving source that generates a driving force of the vehicle is in an operable state; and display of the captured image has been started by the display unit.

3. The apparatus according to claim 1, wherein the start of display of the captured image by the display unit is determined based on an elapse of a time needed for the display unit to change from a non-display state to a display state.

4. The apparatus according to claim 3, wherein the time is a time uniformly determined independently of a temperature.

5. The apparatus according to claim 3, wherein the time is a time that is changed in accordance with a temperature.

6. The apparatus according to claim 1, wherein the image capturing unit captures a side and a rear of the vehicle, and the vehicle is a side-mirrorless vehicle.

* * * * *